United States Patent
Reynolds

Patent Number: 6,027,424
Date of Patent: Feb. 22, 2000

[54] HIGH AND LOW GEAR SHORT TRANSMISSION

[76] Inventor: Roger L. Reynolds, #9 Shawnee Dr., Hannibal, Mo. 63401

[21] Appl. No.: 09/131,799

[22] Filed: Aug. 10, 1998

[51] Int. Cl.⁷ .................................................... F16H 3/46
[52] U.S. Cl. ........................... 475/316; 475/269; 475/312
[58] Field of Search ................... 475/269, 311, 475/312, 314, 315, 316

[56] References Cited

U.S. PATENT DOCUMENTS

| | | | |
|---|---|---|---|
| 2,115,964 | 5/1938 | Osborne | 475/316 |
| 2,540,965 | 2/1951 | Schjellinger | 475/316 X |
| 2,939,558 | 6/1960 | Schjolin | 475/316 X |
| 5,509,863 | 4/1996 | Mansson | 475/273 |
| 5,511,436 | 4/1996 | Hasegawa | 74/331 |
| 5,556,312 | 9/1996 | Ogino | 440/75 |

*Primary Examiner*—Sherry L. Estremsky
*Attorney, Agent, or Firm*—Don W. Weber

[57] ABSTRACT

A short boat motor transmission is presented that is less than five inches wide. The main parts of the transmission includes a high clutch drum which contains a Belleville spring, an input ring gear and clutch plates secured at the top by a pressure containment ring and snap-ring. The input ring gear is connected directly to the motor. This ring gear is also connected to a pinion carrier and four pinion planetary gears. The output shaft of the transmission is attached to the pinion carrier. The planetary gears in the pinion carrier are connected to the inner teeth of the input ring gear and to a sun gear. The outer part of the pinion carrier may also be mechanically connected in locked position to the input ring gear by clutch plates. The sun gear is connected to a one-way locking mechanism which only allows the gear to turn in one direction. Since all of the centers of the various parts are in alignment and since the various parts are nested the transmission is very short. When the piston carrier and input ring gear are connected together by the clutch plates, the transmission is in high gear. When the pinion carrier and input ring gear are not so connected, the transmission is in low gear.

7 Claims, 10 Drawing Sheets

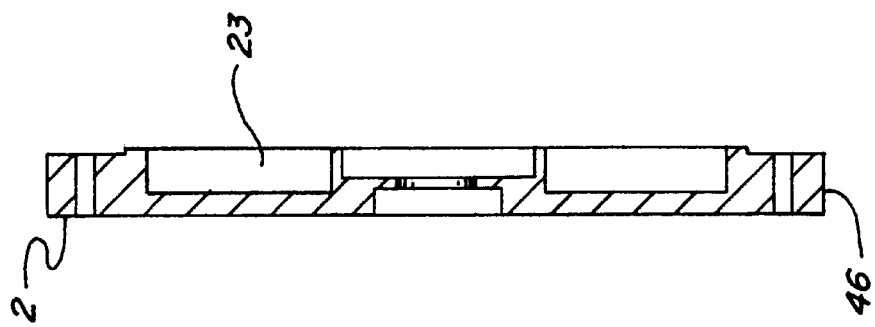
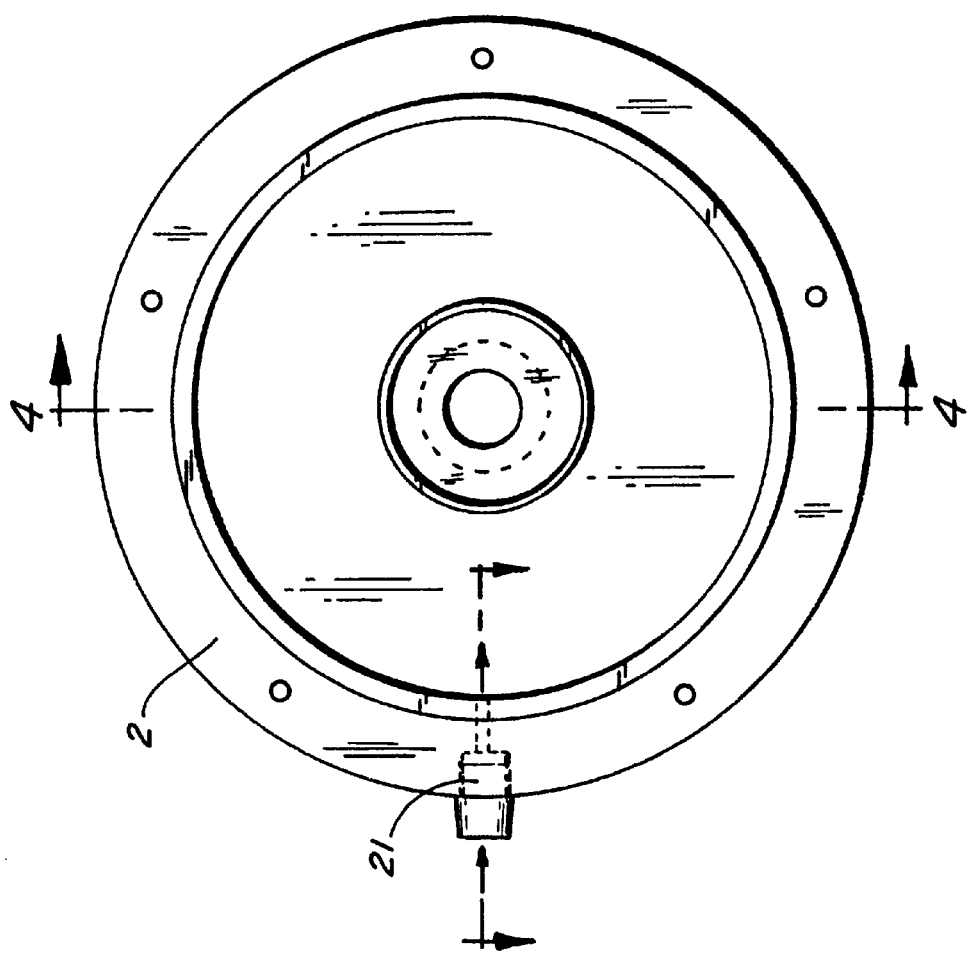

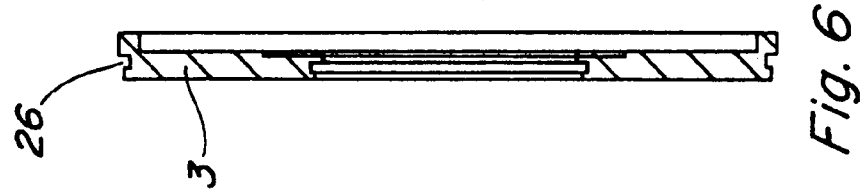
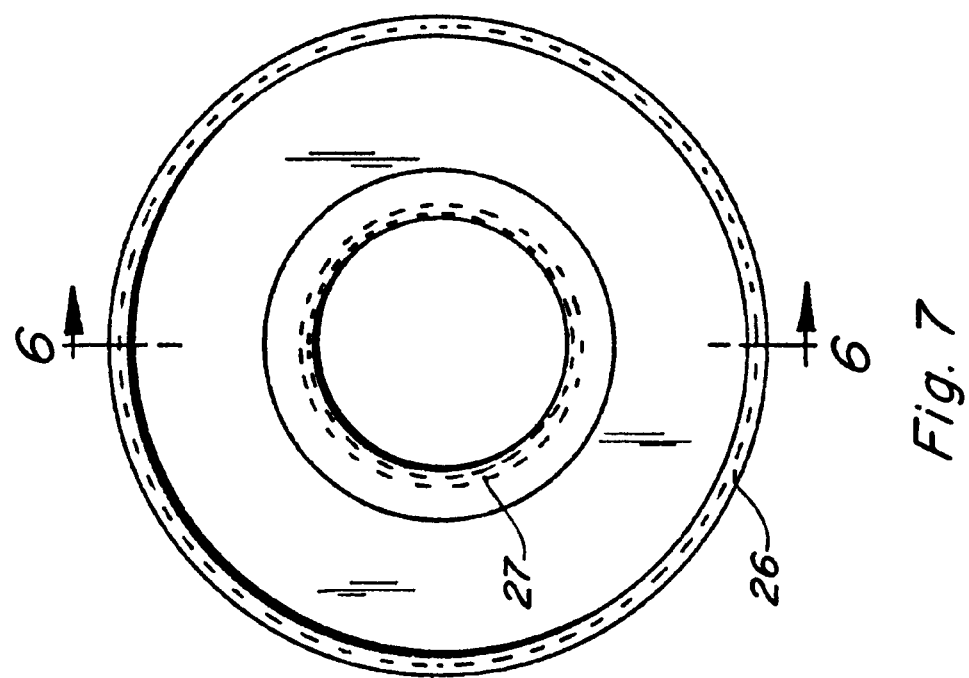

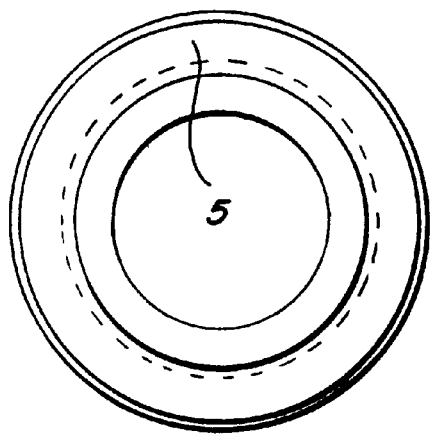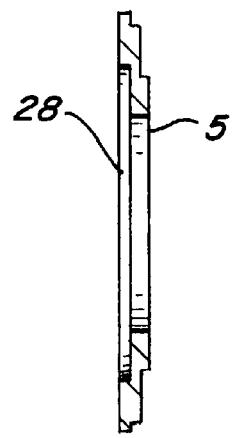
Fig. 9  Fig. 8
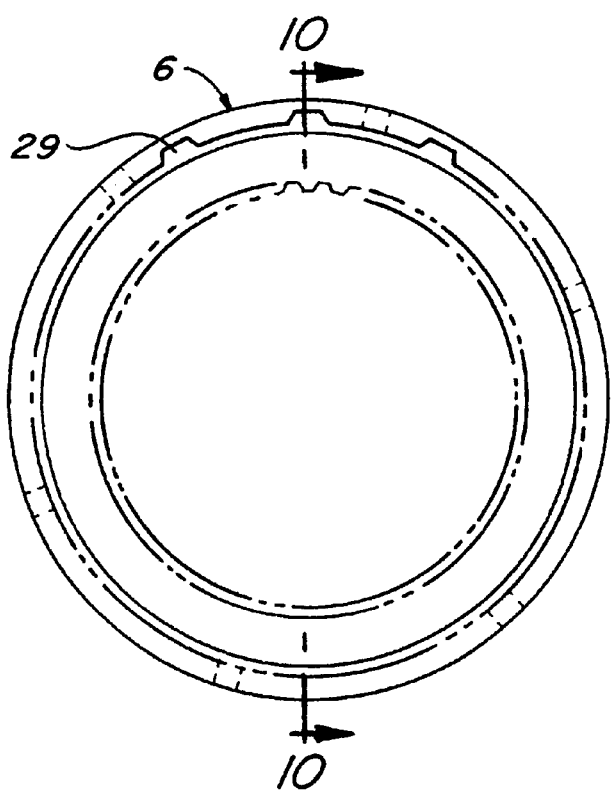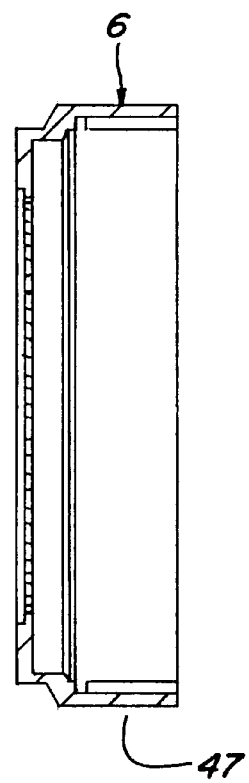
Fig. 11  Fig. 10

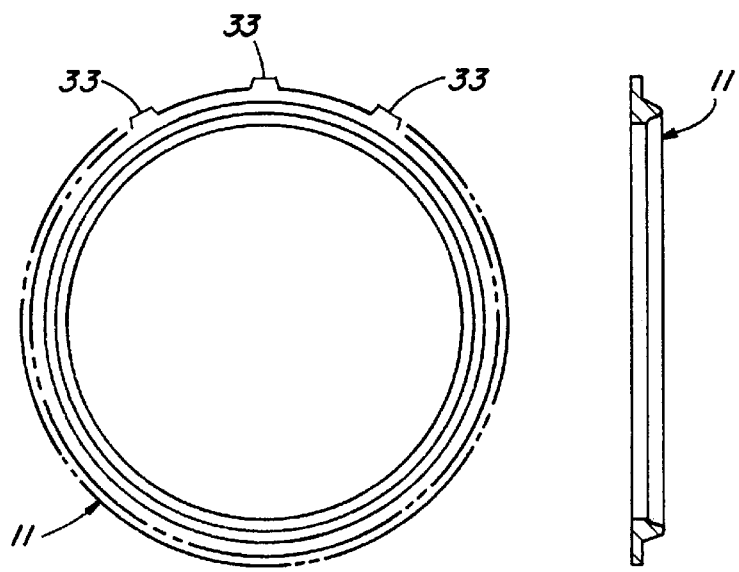
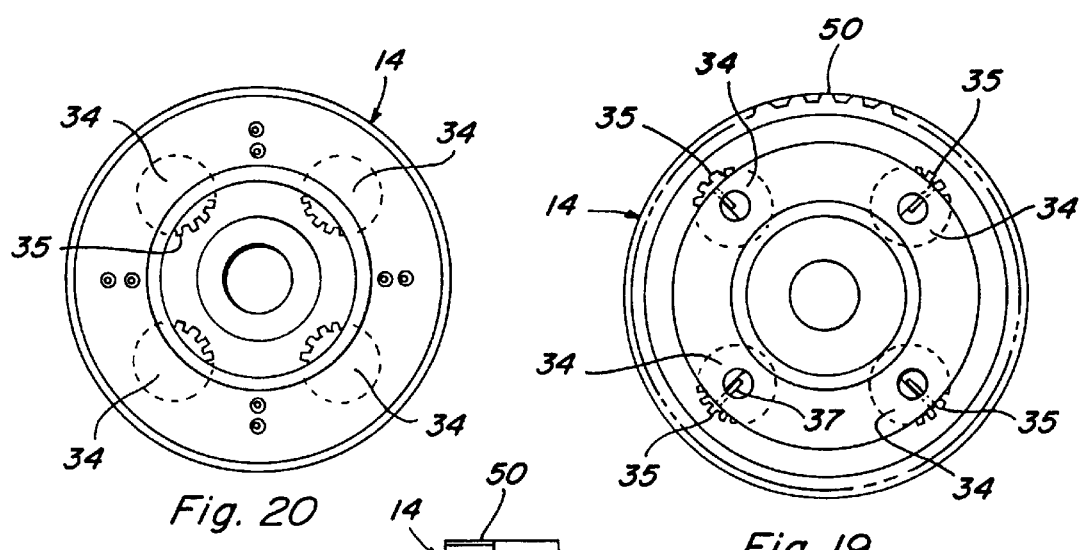
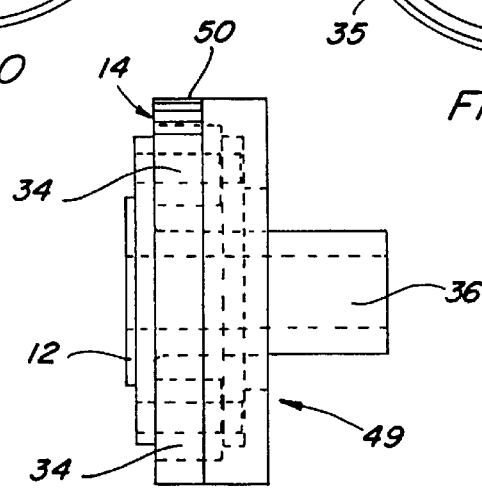

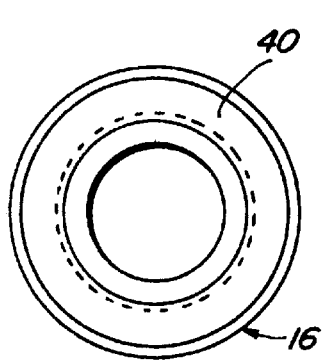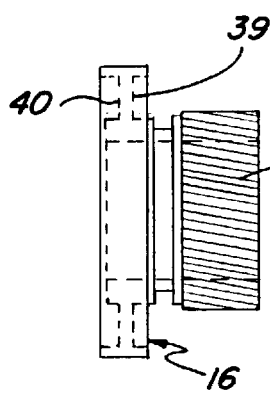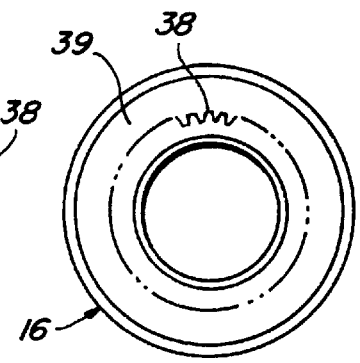
Fig. 22    Fig. 21    Fig. 23
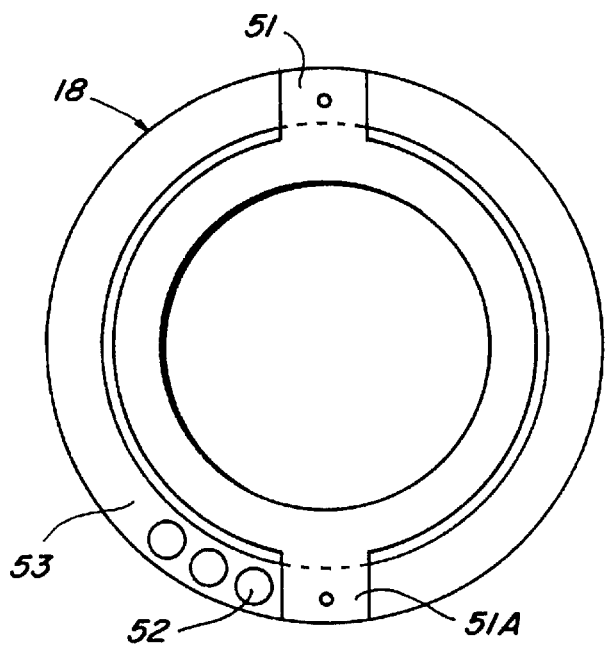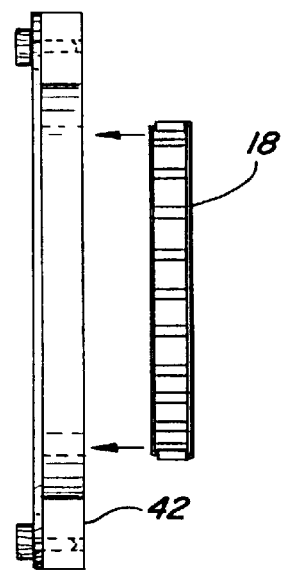
Fig. 24
Fig. 25

HIGH AND LOW GEAR SHORT TRANSMISSION

BACKGROUND OF THE INVENTION

Since the advent of automatic transmissions, many inventions have been developed that are devoted to the improvement of the function and power delivery capabilities of the transmissions. Most transmissions are found in cars or trucks. These transmissions are designed to convert the power of the engine to torque, usually at the rear axle. Because the length from the engine output to the rear axle is normally six to ten feet, most transmissions are elongated and spread out over a number of feet.

In the boating industry, and for other applications, the length between the output of the engine and the propeller shaft or other output requirement is often quite small. This length can be measured in feet or sometimes in parts of a foot. However, there is a paucity of developments for transmissions that will shift the boat from low to high gear and also fit the limited space available for the transmission between the motor output and the propeller input shaft. It is a purpose of this invention to provide a very short transmission.

Most boats do not have any type of transmission whatsoever. Boats normally have one position of the motor for forward, a neutral position, and a second position for reverse. The problem with this is that when a boat pulls away from a stop, similar to the conditions present when automobiles pull away from a stop, the engine needs more torque and less revolutions per minute. However, once the boat is in motion, less torque and more revolutions per minute are desirable to run the boat at a faster speed. Up until now, no short transmission has been developed that will deliver both a low and a high gear. It is another object of this invention to provide a transmission for a motor driven boat and propeller system which will provide both a low pulling gear and a high speed running gear.

Since most transmissions required to deliver power from a motor to an output shaft can be anywhere from four to six feet long, there has never been a premium put on a compact and short transmission for use in applications such as the one presented here. It is a still further object of this invention to present a compact and short boat engine which has its major components nested inside each other.

When one starts the engine in forward on the normal boat, a decided clunk can be heard when the torque of the motor is transmitted to the output shaft of the propeller. In these situations, the mechanical clunk heard often results in damage to the bushings around the propeller and in other mechanical stress to the entire torque delivery system. It is a still and further object of this invention to provide a dampening system which will reduce the mechanical stress applied to a propeller and shaft when the engine torque is applied to the output shaft.

Other and further objects of this invention will become apparent upon reading the below described Specification.

BRIEF DESCRIPTION OF THE INVENTION

An extremely short boat transmission is present at which is less than five inches wide. The transmission has an end plate and piston which are mechanically connected to a clutch drum. Inside the clutch drum is a Belleville spring, clutch plates and an input ring gear. This input ring gear is connected to the motor and also connected to a pinion carrier by gears. The pinion carrier is nested partially inside the input ring gear and clutch drum. The pinion carrier has an output shaft fixedly connected at its center. The pinion carrier also rotatably houses a number of planetary gears which are gearedly connected to the input ring gear and to a sun gear. The pinion carrier may also be mechanically locked to the input ring gear by clutch plates. An innermost sun gear is gearedly connected to the pinion gears of the pinion carrier and to a one-way locking mechanism. A one-way locking mechanism, connected to the sun gear, only allows the sun gear to turn when the transmission is in high gear. A damper mechanism is also attached to the sun gear to create a dampening effect when the engine is started.

All of the parts are essentially cylindrical in cross-section. Their centers are in longitudinal alignment and most of the parts are nested together so that the entire transmission is less than five inches in width.

The motor is connected directly to the input ring gear. When the pinion carrier and related gears are locked to the input ring gear by the clutch plate mechanism, the transmission is in high gear. When the pinion carrier is not connected to the input ring gear by the clutch plate mechanism the transmission is in low gear.

BRIEF DESCRIPTION OF DRAWINGS

FIG. 4 is a side cutaway view of the end plate taken along Lines 4—4 of FIG. 5.

FIG. 5 is a front view of the end plate shown from a view from right to left on the exploded view of FIG. 1. (Unless otherwise specified, all front views are shown from the right to left direction for each of the parts enumerated herein.)

FIG. 6 is a side cutaway view of the piston plate taken along Lines 6—6 of FIG. 7.

FIG. 7 is a front view of the piston plate shown in FIG. 6.

FIG. 8 is a side cutaway view of the centering disc.

FIG. 9 is a front view of the centering disc.

FIG. 10 is a side cutaway view of the high clutch drum taken along Lines 10—10 of FIG. 11.

FIG. 11 is a front view of the high clutch drum.

FIG. 16 is a side cutaway view of the pressure containment ring.

FIG. 17 is a front view of the pressure containment ring.

FIG. 18 is a side cutaway view of the pinion carrier, showing the output shaft.

FIG. 19 is a front view of the pinion carrier shown in FIG. 18.

FIG. 20 is a rear view of the pinion carrier shown in FIG. 18, taken from left to right of the view of the pinion carrier shown in FIG. 1.

FIG. 21 is a side view of the sun gear.

FIG. 22 is a front view of the sun gear shown in FIG. 21.

FIG. 23 is a rear view of the sun gear shown in FIG. 21, taken from left to right of the view of the sun gear shown in FIG. 1.

FIG. 24 is a side exploded view of the one-way clutch.

FIG. 25 is a front view of the one-way clutch shown in FIG. 24.

DETAILED DESCRIPTION OF THE PREFERRED EMBODIMENT

A short transmission for a boat or other motorized device is disclosed herein. The short transmission has a hollow, central output shaft and is used to convert the output of a motor through a gearing system to change gears on a boat propeller shaft or similar device.

Figure 1:
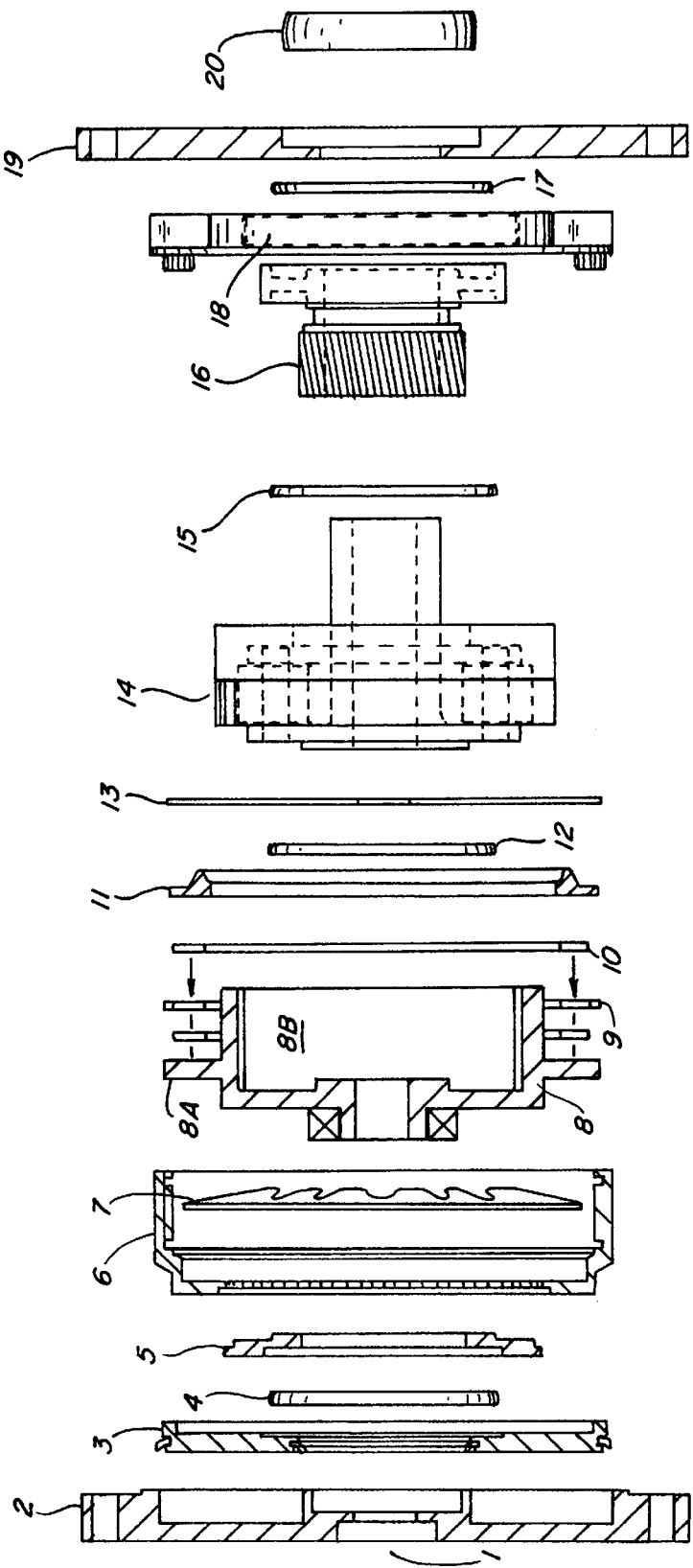
FIG. 1 is a side, cutaway exploded view of the short transmission.
Figure 2:
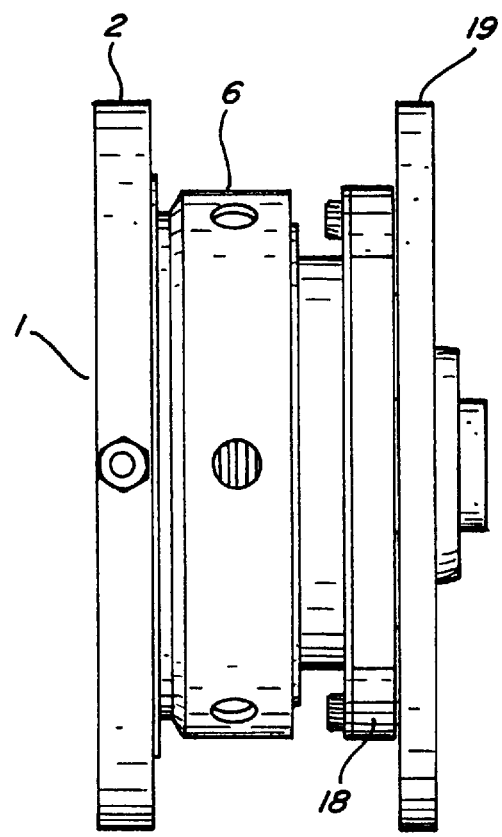
FIG. 2 is a side view of the short transmission shown in its assembled state.
Figure 13:
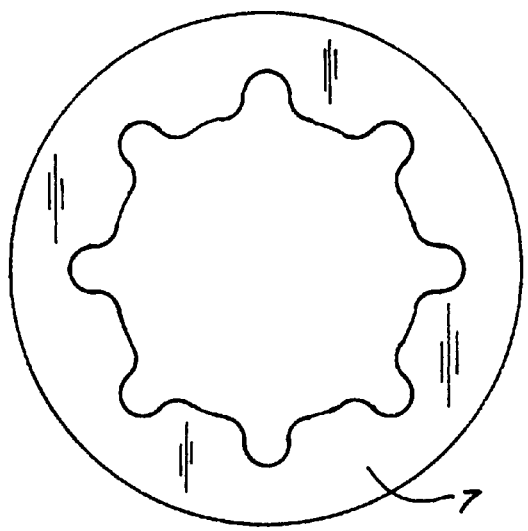
FIG. 13 is a front view of the Belleville spring shown in FIG. 12.
Figure 12:
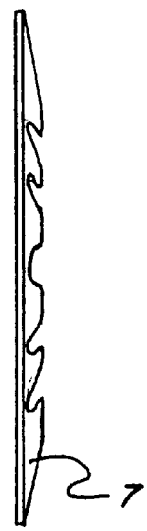
FIG. 12 is a side view of the Belleville spring.

The short transmission 1 is shown in exploded view on FIG. 1 and in its assembled condition in FIG. 2. All of the parts described herein are essentially cylindrical in shape and have concentric centers. Because all of the parts are cylindrical with concentric centers, and further because all of the parts are nested and designed to fit within each other, a very short transmission is made available for use in situations where longer transmissions would not function properly.

Figure 3:
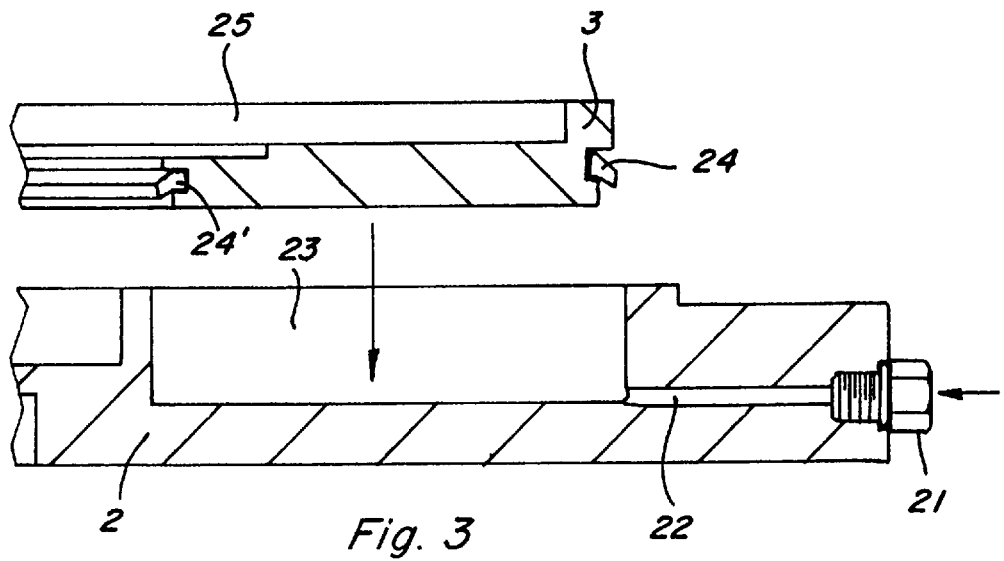
FIG. 3 is a partial cutaway view of the end plate and piston plate.

The short transmission has at its motor end a motor end plate 2, best shown on FIGS. 2, 4 and 5. This motor end plate has a large groove 23 between its outer edge and concentric center sufficient to receive a piston plate 3. The piston plate is best shown in FIGS. 3, 6, and 7. The piston plate moves in a left or right direction as shown in the exploded view of FIG. 1 in a manner to be described hereafter.

This piston plate 3 has an essentially circular cross-section, as best shown in FIG. 7, and a narrow width, as best shown in FIG. 6. The piston plate 3 is received within the motor end plate 2 when in the assembled condition.

In order to make the transmission perform smoothly, a number of thrust bearings are placed throughout the device. One such bearing, the piston plate thrust bearing 4 is placed as shown on FIG. 1. A centering disc 5 (best shown in on FIGS. 8 and 9) is placed at the center of the high clutch drum 6.

When assembled, the motor end plate 2, piston plate 3, and piston thrust bearing 4 are all located within the width of the motor end plate 2. Centering disc 5 is best shown on FIGS. 8 and 9.

Turning now to FIGS. 10 and 11, the high clutch drum 6 is shown. This narrow high clutch drum is essentially cylindrical in shape as shown on FIGS. 10 and 11. The high clutch drum has a large hollow area adapted to receive other parts of the transmission as will be subsequently described. Holes 41 in the side of the drum allow oil to seep out. Nested inside and to the extreme left of the high clutch drum 6 is a Belleville spring 7. This spring 7 holds the clutch plates in a normally biased (compressed) position. The clutch plates are engaged when compressed. The clutch drum is mechanically connected to the piston plate.

The high clutch drum 6 is adapted to receive the input ring gear 8 and to partially receive the pinion carrier 14. The input ring gear 8 is also cylindrical in shape and has a longitudinal center that is concentric with the other pieces hereinbefore and hereinafter described. The input ring gear is nested within the clutch drum 6.

The input ring gear 8 has an input ring gear flange 8A. To the right of this flange 8A are the input ring gear clutch plates, as shown partially in FIG. 1. At the right of the input ring gear 8 is a fiber gear clutch plate 10, as shown on FIG. 1. To the left of the fiber gear clutch plate 10 is a metal gear clutch plate 9. The clutch plates alternate between fiber and metal and are on the outside of the inner area 8b of the inner ring gear 8 as shown in FIG. 1. This arrangement of metal and fiber gear clutch plates is common throughout the mechanic and transmission field and this arrangement is well known in the art. The gear clutch plates are designed to change gears in the transmission once pressure is applied to compress the plates together, as will be hereinafter described. The input gear 8 is connected directly to the input shaft of the motor.

In order to hold the fiber and metal gear clutch plates between flange 8A and the right edge of the input ring gear 8, a pressure containment ring 11 is placed at the right end of the input ring gear as shown on FIG. 1. This pressure containment ring 11 is located between flange 8A and the right edge of the input ring gear assembly and is locked into place by means of snap ring 13. Again, this method of containment of the gear clutch plates is commonly known throughout the art. The input ring gear 8 is connected to the high clutch drum 6 by input ring gear locking flanges 30 which fit into the high clutch drum female slots 29. The input ring gear also has inner teeth 31.

Between the base of the input ring gear 8 and the bottom of the pinion carrier 14 is located a pinion carrier thrust bearing 12 as shown in FIGS. 1 and 18.

The alternating metal gear clutch plates 9 have metal gear clutch plate locking flanges, similar to the ring gear locking flanges 30. The high clutch drum 6 has a series of input ring gear female slots 29, as best shown on FIG. 11. The metal gear clutch plate flanges are adapted to be received within the high clutch drum female slots 29. The metal gear clutch plates have a smooth inner circumference. However, the concentric fiber gear clutch plates have inner circumferential teeth corresponding to teeth on the outside of the pinion carrier 14, which move freely unless all of the clutch plates are compressed together. When the fiber and metal gear clutch plates are forced together, the fiber gear clutch plate inner teeth will mesh with the outer pinion carrier teeth.

However, in a decompressed, or unapplied condition, the fiber gear clutch plates move freely and are incapable of moving any other part meshed together with the fiber clutch plates.

Figure 14:
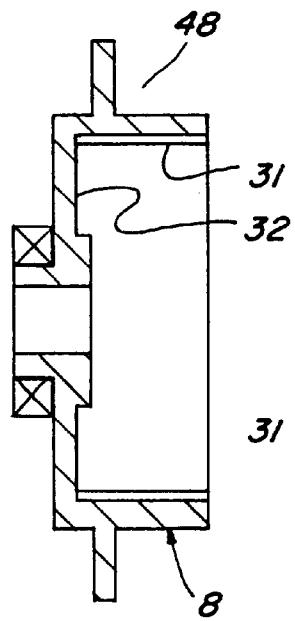
FIG. 14 is a side cutaway view of the input ring gear taken along Lines 14—14 of FIG. 15.

The input ring gear 8 also has inner concentric teeth 31, as best shown on FIG. 14, for meshing engagement with the teeth of the planetary gears.

The pressure containment ring 11 is best shown in FIG. 16. The pressure containment ring 11 also has containment ring male flanges 33 as best shown on FIG. 17. These containment ring male flanges 33 are adapted to be received within the high clutch drum female slots 29. The Belleville spring 7, metal 9 and fiber 10 gear clutch plates, and pressure containment ring 11 are held in place by means of the snap ring 13. All of these components are essentially cylindrical with a concentric center relative to the concentric center of the other pieces of the device and fit within the width of the high clutch drum 6.

Next to the fiber gear clutch plates is a pinion carrier 14, as best shown on FIGS. 1, and 18 through 20. The pinion carrier 14 is essentially cylindrical in shape, having a larger cylinder for the main body and a smaller, central cylindrical shaft protruding from the main body. The pinion carrier is nested within the input ring gear and is thus partially within the clutch drum 6. The central shaft 36 is the output shaft for the device. This shaft 36, as best shown on FIG. 18, is hollow and is adapted to receive the propeller shaft from a boat. The shaft may be splined to connect it to the propeller shaft.

Figure 15:
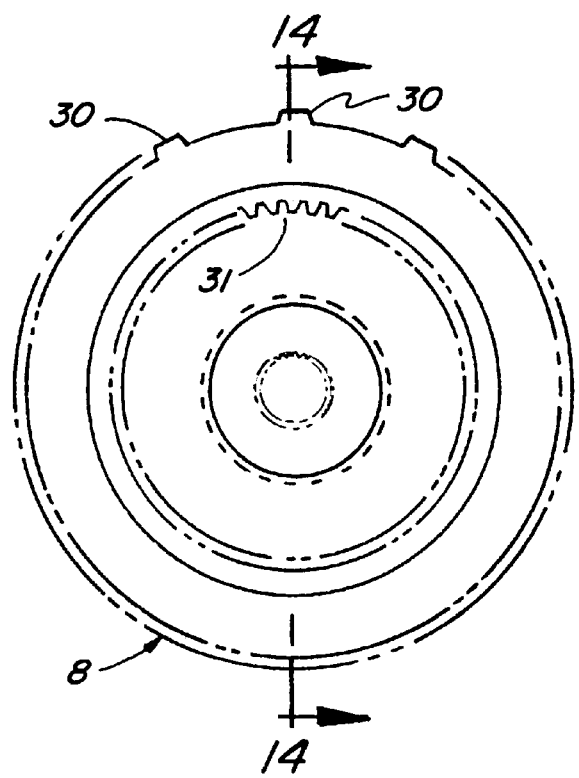
FIG. 15 is a front view of the input ring gear.

The planetary gears 34 are located within the pinion carrier 14. They are held in place by pins 37. This pinion carrier 14 comprises a number of planetary gears 34, rotatably attached to the main pinion carrier 14, as best shown in FIGS. 18 through 20. The teeth 35 of the planetary gears 34 are adapted to be received by the inner teeth 31 of the input ring gear 8 shown on FIG. 15. The pinion carrier 14 is nested with the input ring gear such that the input ring gear 8 and pinion carrier 14 are rotatably meshed together by the planetary gears 34.

The pinion carrier 14 also has an output shaft 36. This hollow output shaft 36 is connected to the boat propeller.

The pinion carrier 14 is nested within and concentric with the other parts of the device and rotates freely when the gear clutch plates 9 and 10 are decompressed. Once forward pressure is applied to the high clutch drum 6 by piston plate 3, the fiber gear clutch plates 10 and the metal gear clutch plates 9 decompress loosening the gear clutch plates. (The Belleville spring compresses the clutch plates.) The fiber gear clutch plate teeth, meshed with the pinion carrier outer teeth 50, then turn the pinion carrier 14.

At this stage in the assembly of the device, the distance from the outer edge of end plate 2 to the front edge 49 of the main body of the pinion carrier 14 is approximately four inches.

Inside the pinion carrier 14, and meshed therewith, is a sun gear 16, as best shown in FIGS. 21 through 23. This sun gear 16 has a lower cylindrical body with outer sun gear teeth 38 and an essentially cylindrical upper body 32 as shown in Drawing FIGS. 1 and 21. The sun gear is essentially cylindrical and is adapted to be partially received within the main cylindrical portion of the pinion carrier 14. The sun gear 16 also has an inner thrust bearing 15 and an outer thrust bearing 17 as best shown on Drawing FIG. 1. The inner thrust bearing 15 fits within the annular slot 39 shown on FIG. 21, while the outer thrust bearing 17 fits within the annular slot 40 shown on FIG. 21.

The lower, cylindrical sun gear teeth 38 have a smaller diameter than the pinion carrier 14 or the input ring gear 8.

Connected to the sun gear 16 is a one-way clutch 18. This one-way clutch only allows for rotation in one direction. The one-way clutch is connected to the upper body 32 of the sun gear. The sun gear 16 is the innermost gear in this design. In order for the transmission to function properly the sun gear must not be allowed to rotate in a counter clockwise direction. (All directions herein are as viewed from left to right in Drawing FIG. 1.) The sun gear is ineffective in the drive gear configuration of the transmission. When in high gear, the one-way clutch allows the sun gear to rotate freely; when in low gear the one-way clutch prohibits the sun gear from moving.

Surrounding the one-way clutch 18 is a damper assembly, shown generally on FIGS. 24 and 25 at 42. This damper assembly has stops 51 and 51A. Between stops 51 and 51A a plurality of cylindrical rubber dampers 52 are positioned. These dampers 52 ride on surface 53. They are held in position by the back surface 54 of output end plate 19. When the engine is started, the damper ring 42 is allowed to turn approximately 150 degrees of rotation until the dampers 52 are compressed and the damper ring, one-way clutch, sun gear and connected mechanisms begin to rotate. The effect of the damper ring is to eliminate the mechanical "clunk" inherent in many motor-propeller systems.

Figure 26:
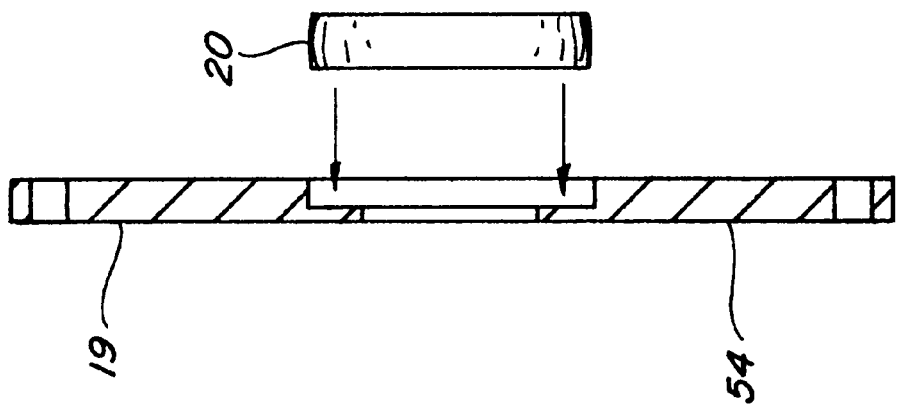
FIG. 26 is a side cutaway exploded view of the output end plate.
Figure 27:
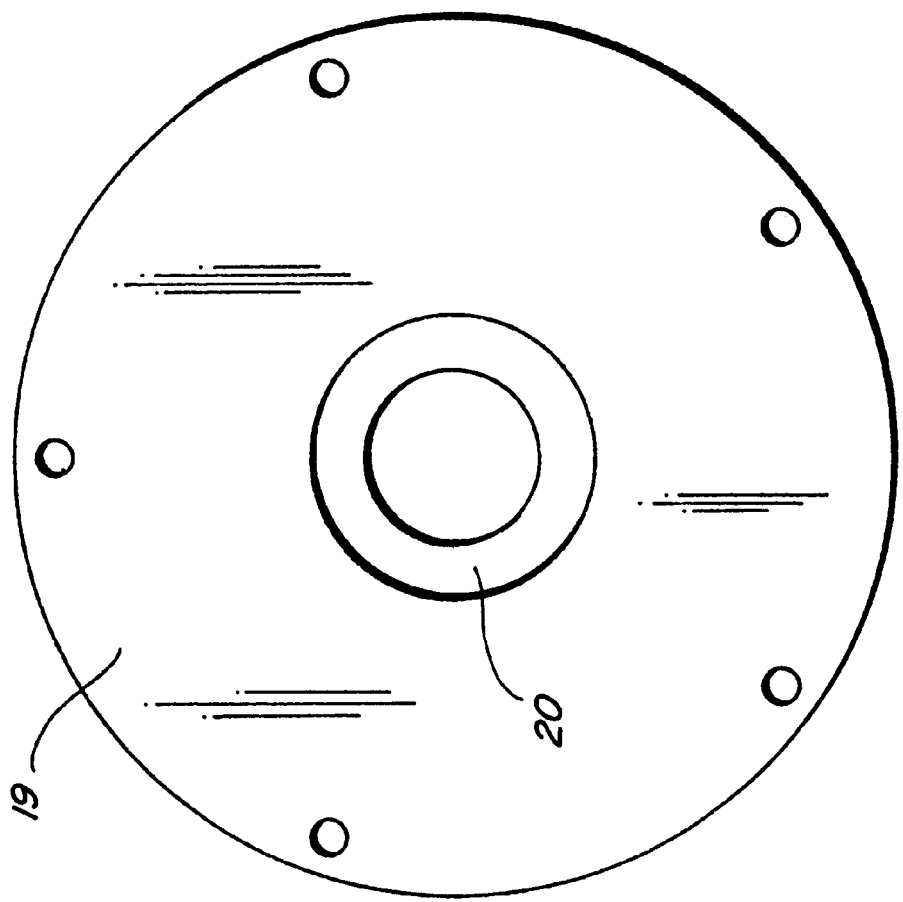
FIG. 27 is a front view of the output end plate shown in FIG. 26.

Located around the one-way clutch 18 is the output end plate 19. The output end plate 19 has a bearing 20 located as shown in FIGS. 26 and 27.

The width of the entire short transmission is approximately 4½ inches when assembled. This allows for the efficient gearing of a motor to the propeller shaft by the function of the various gears shown.

In actual operation, hydraulic fluid is introduced through oil inlet 21 of the motor end plate 2, as shown in FIGS. 3 and 5. The hydraulic fluid is then introduced under the piston plate 3 through the oil inlet shaft 22. Best shown on FIG. 3, this piston plate 3 lies within the piston plate large groove 23. The piston plate 3 has an outer annular seal groove 26 and inner annular seal grove 27. These sealed grooves are adapted to receive outer 24 and inner 24' annular seals. The piston plate also has a piston plate thrust bearing groove 25. The centering disc has a centering disc thrust bearing groove 28.

Once hydraulic fluid is introduced into the motor end plate 2, the piston plate 3 moves forward or in the direction from left to right shown in FIG. 1. The piston plate 3 exerts force on the high clutch drum 6 and moves the high clutch drum in the left to right direction as shown on FIG. 1. When the high clutch drum moves from the left to right position, it detensions the Belleville spring 7 which in turn disengages the clutches. When the metal and fiber clutches are disengaged, the inner teeth of the fiber clutches rotate freely within the high clutch drum. The fiber clutches thus do not drive the input ring gear, or any of the other gears connected thereto.

When the fiber clutch plates are in their normal or compressed condition (no hydraulic fluid introduced into the end plate and the piston plate to the extreme left on Drawing FIG. 1) these clutch plates then drive the pinion carrier 14. The clutch drum and ring gear are then in a one-to-one ratio to the pinion carrier and the transmission is in high gear.

When the transmission is in first or low gear, the output shaft is designed to move slower than the motor. The output shaft is then in a reduced condition. This lower or first gear is operable when the clutch plates are disengaged, with the piston in the direction to the left on Drawing FIG. 1.

The input ring gear 8 is driven directly by the motor. When the transmission is locked up, that is when the fiber clutch plates are compressed and applied, all of the parts move at once at the same speed. This is the one-on-one, second gear, high, in the transmission.

When the clutch plates are disengaged (with the piston in the direction from left to right) the input ring gear is still driven by the motor. This input ring gear in turn drives the planetary gears. The planetary gears walk around the sun gear teeth 38. However, the sun gear will not turn due to the sprag element 18. The effect of this interrelationship is to cause a reduction in the speed of the output shaft such that the transmission now puts the system in a lower gear. (This is commonly referred to as the pulling gear or first gear.)

The combination locking one-way clutch and damper assembly prevents the sun gear from spinning counterclockwise and creates the first gear or the reduced gear. The assembly also dampens the engagement to reduce stern drive cluck. The one-way clutch assembly can be a BORG- WARNER E40D intermediate sprag element. However, other similar one-way clutch elements could be substituted while still keeping within the spirit and disclosure of this invention.

This device also has a hollow output shaft that is capable of being splined in order to allow a splined shaft to slide up inside the transmission. This housing turns at a reduced speed in first gear and a faster speed in second gear. The pinion gears are ineffective in the second drive gear to produce the faster speed. While four pinions are used in the preferred embodiment, any plurality of pinion gears could be used, the most common number being three to six pinion or planetary gears. The number of pinions would be utilized depending upon the strength level of the planetary gear set.

The reduced first gear could reduce a 1,000 rpm engine to a 750 rpm rotation on the propeller.

Figure 28:
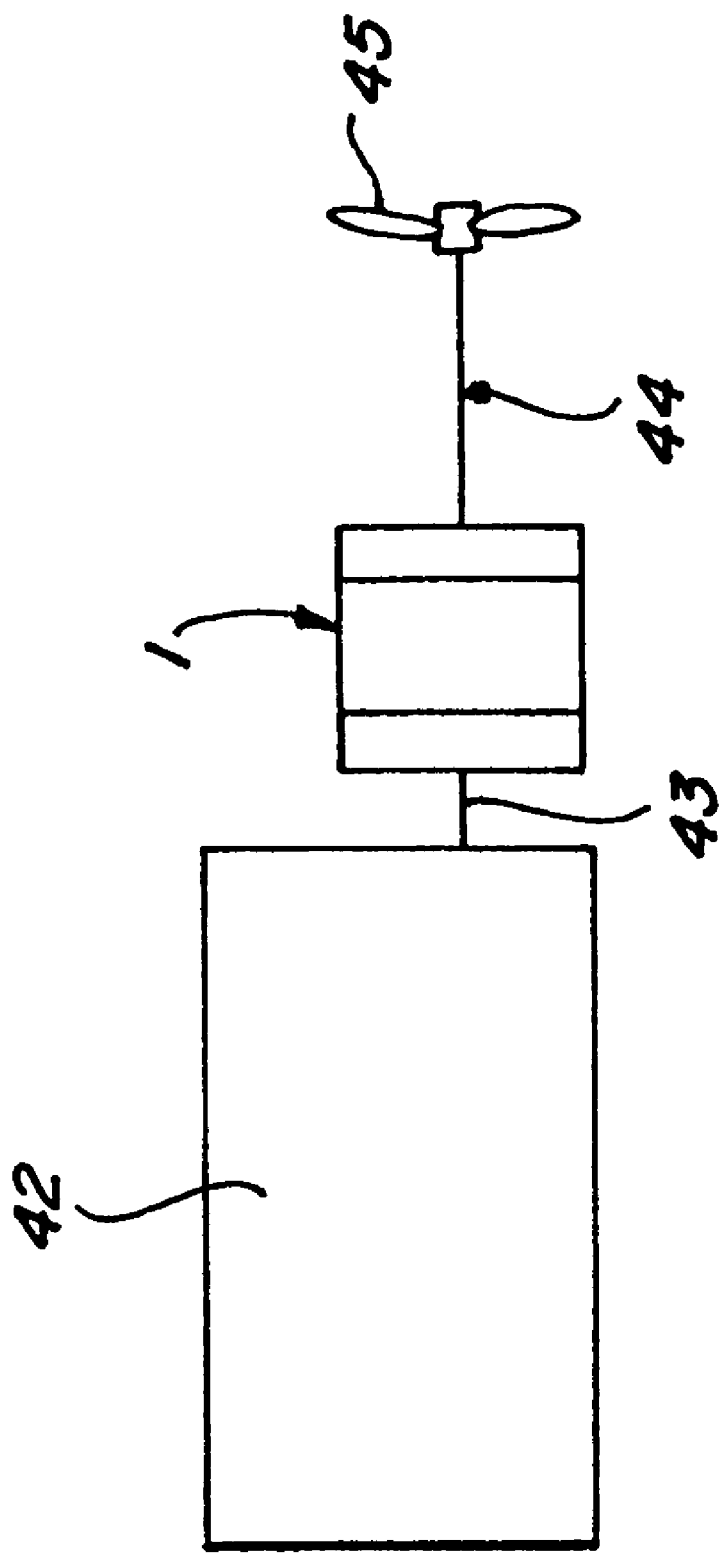
FIG. 28 is a block schematic diagram showing the relationship between the motor, short transmission and propeller of a boat.

When in use in a boat or other device, the boat motor 42, as best shown in FIG. 28, is attached to the short transmission by means of the boat motor output shaft 43. The transmission is capable of producing both a low and a high gear. The transmission 1 is connected to the propeller 45 by means of a propeller shaft 44.

The width 46 of the motor end plate is approximately ¾ of an inch. The width 47 of the high clutch drum is approximately 2 inches. The width 48 of the input ring gear is also approximately 2 inches, while the output shaft of the input ring gear is approximately 1 inch. Although the sun gear is approximately 2 inches, most of the sun gear is nested concentrically within the other parts. Though all of the parts in their exploded condition, as shown in FIG. 1, would normally be approximately 4 to 6 feet in length, the unique method of compacting the various gears and other parts of the device create a very short transmission that can be as short as 4½ inches. The centers of the motor end plate, piston, drum, input ring gear, sun gear, pinion carrier, locking sprag and output end plate are nested and in longitudinal alignment.

Most of these gears mentioned in the disclosure of this device, including the high clutch drum, planetary gear and housing, sun gear, snap rings, and clutch plates are variations of commonly used parts found throughout the transmission industry. However, it is their unique, nested, concentric, arrangement which limits the width of the device to manageable proportions with respect to the particular application of an engine to a boat propeller or in other similar applications. Obviously, minor variations of the parts or arrangements of the parts in this disclosure are still within the keeping and spirit of the invention herein.

The main parts of this device include the pressurized end plate 1 and piston 2, mechanically connected to the high clutch drum 6. Nested inside the high clutch drum 6 is the input ring gear 8. Also nested within the high clutch drum 6 and gearedly connected to the input ring gear is the pinion carrier 14. The pinion carrier 14 is fixedly connected to the output shaft 36. The pinion carrier has a plurality of pinion or planetary gears which are gearedly connected to the sun gear. The sun gear is mechanically connected to the one-way locking clutch mechanism. The one-way locking clutch mechanism only allows for rotation of the sun gear when the transmission is in the second or drive gear.

Having fully described my device, I claim:

1. A short transmission having high and low gears, comprising:
   (1) an essentially cylindrical motor end plate and concentric piston located within said end plate;
   (2) an essentially cylindrical high clutch drum mechanically connected to said piston having an inner area adapted to receive clutch plates and a means for biasing said clutch plates;
   (3) an essentially cylindrical input ring gear nested inside said clutch drum, and gearedly connected to a pinion carrier;
   (4) said pinion carrier being nested partially inside said high clutch drum and fixedly connected to an output shaft and housing a plurality of planetary gears, wherein said planetary gears are gearedly connected to the inner teeth of said input ring gear and to the lower, outer teeth of a sun gear, wherein said pinion carrier may be gearedly connected to said input ring gear by said planetary gears;
   (5) wherein said sun gear is nested partially inside said pinion carrier, gearedly connected to said pinion gears and connected to a one-way locking mechanism;
   (6) wherein said one-way locking mechanism is reversibly connected to said sun gear, and wherein said locking mechanism only allows said sun gear to turn when said transmission is in high gear; and
   (7) an output end plate located at the output end of said short transmission;
   wherein the centers of said motor end plate, piston, drum, ring gear, pinion carrier, sun gear, locking mechanism, and output end plate are in longitudinal alignment;
   whereby, when said clutch plates are engaged said clutch drum and ring gear are connected directly to said pinion carrier in a 1:1 ratio in high gear; and
   whereby when said clutch plates are disengaged said clutch drum and ring gear are connected to said pinion carrier through said planetary gears in a reduced ratio to produce low gear.

2. A short transmission as in claim 1, wherein the overall width of said transmission is less than five inches.

3. A short transmission as in claim 1, further comprising a damper assembly connected to said one-way clutch which will turn approximately 150 degrees of rotation before torque is applied to said output shaft.

4. A short transmission as in claim 1, wherein said biasing means is a Belleville spring.

5. A short transmission as in claim 1, wherein said plurality of planetary gears is at least three but not more than six.

6. A short transmission as in claim 1, wherein said clutch plate means comprises a plurality of alternating fiber clutch plates having inner gear teeth and a plurality of metal gear plates having outer male flanges.

7. A short transmission as in claim 1, wherein said output shaft is hollow and may be connected to a propeller shaft by means of a spline.

* * * * *